United States Patent
Nakagawa et al.

(10) Patent No.: US 11,114,695 B2
(45) Date of Patent: Sep. 7, 2021

(54) ELECTROLYTE FOR ELECTROCHEMICAL DEVICE, ELECTROLYTIC SOLUTION, AND ELECTROCHEMICAL DEVICE

(71) Applicant: OTSUKA CHEMICAL CO., LTD., Osaka (JP)

(72) Inventors: Taiji Nakagawa, Tokushima (JP); Yoshihisa Tokumaru, Tokushima (JP); Shoji Hiketa, Tokushima (JP)

(73) Assignee: OTSUKA CHEMICAL CO., LTD., Osaka (JP)

( * ) Notice: Subject to any disclaimer, the term of this patent is extended or adjusted under 35 U.S.C. 154(b) by 167 days.

(21) Appl. No.: 16/320,208

(22) PCT Filed: Jul. 31, 2017

(86) PCT No.: PCT/JP2017/027584
§ 371 (c)(1),
(2) Date: Jan. 24, 2019

(87) PCT Pub. No.: WO2018/021577
PCT Pub. Date: Feb. 1, 2018

(65) Prior Publication Data
US 2019/0273284 A1 Sep. 5, 2019

(30) Foreign Application Priority Data
Jul. 29, 2016 (JP) .............................. JP2016-150773

(51) Int. Cl.
| | |
|---|---|
| *H01M 10/0567* | (2010.01) |
| *H01G 11/62* | (2013.01) |
| *H01M 10/0525* | (2010.01) |
| *H01M 10/052* | (2010.01) |
| *H01M 10/0568* | (2010.01) |

(52) U.S. Cl.
CPC ........ *H01M 10/0567* (2013.01); *H01G 11/62* (2013.01); *H01M 10/052* (2013.01); *H01M 10/0525* (2013.01); *H01M 10/0568* (2013.01); *H01M 2300/0025* (2013.01); *Y02E 60/10* (2013.01); *Y02E 60/13* (2013.01)

(58) Field of Classification Search
CPC ..... H01G 11/58; H01G 11/62; H01M 10/052; H01M 10/0525; H01M 10/0567; H01M 10/0568; H01M 2300/025; Y02E 60/10; Y02E 60/13
See application file for complete search history.

(56) References Cited

U.S. PATENT DOCUMENTS

| | | | |
|---|---|---|---|
| 5,870,275 A | 2/1999 | Shiono et al. | |
| 2013/0224606 A1* | 8/2013 | Koh ....................... | H01G 11/62 429/332 |
| 2014/0113202 A1* | 4/2014 | Sun ................... | H01M 10/0567 429/328 |
| 2014/0158928 A1* | 6/2014 | Zhou ...................... | H01G 11/62 252/62.2 |
| 2014/0377644 A1* | 12/2014 | Ishikawa ........... | H01M 10/0525 429/189 |

FOREIGN PATENT DOCUMENTS

| | | |
|---|---|---|
| JP | 8-321439 | 12/1996 |
| JP | 2004-262896 | 9/2004 |
| JP | 2005-225843 | 8/2005 |
| JP | 2009-65062 | 3/2009 |
| JP | 2012-56897 | 3/2012 |
| JP | 2012-69931 | 4/2012 |
| JP | 2014-99443 | 5/2014 |
| WO | 95/15572 | 6/1995 |

OTHER PUBLICATIONS

International Preliminary Report on Patentability dated Feb. 7, 2019 in International Application No. PCT/JP2017/027584.
International Search Report dated Oct. 31, 2017 in International Application No. PCT/JP2017/027584.

\* cited by examiner

*Primary Examiner* — Anca Eoff
(74) *Attorney, Agent, or Firm* — Wenderoth, Lind & Ponack, L.L.P.

(57) ABSTRACT

To provide an electrolytic solution that suppresses increase in the OH⁻ ion concentration even in the case of electrochemical changes and thereby reduces deterioration or corrosion of resin, rubber, or metal to improve the reliability of an electrochemical device, an electrolyte used in the electrolytic solution, and an electrochemical device comprising the electrolytic solution. The electrolyte, for example, comprises a compound having a cation unit represented by the following formula and an electrolyte (a quaternary ammonium salt or the like).

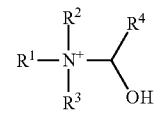

(In the formula, $R^1$, $R^2$, $R^3$, and $R^4$ are the same or different and each represent an alkyl group or an alkoxyalkyl group; $R^1$ and $R^2$ may together form a ring such as a pyrrolidine ring and a piperidine ring; and $R^3$ and $R^4$ may together form a ring such as a pyrrolidine ring and a piperidine ring.)

12 Claims, 2 Drawing Sheets

ELECTROLYTE FOR ELECTROCHEMICAL DEVICE, ELECTROLYTIC SOLUTION, AND ELECTROCHEMICAL DEVICE

CROSS-REFERENCE TO RELATED APPLICATIONS

This application is a national stage application filed under 35 U.S.C. § 371 of International Application No. PCT/JP2017/027584, filed Jul. 31, 2017, and claims priority to Japan Patent Application No. 2016-150773, filed Jul. 29, 2016, the entirety of which is incorporated herein by reference.

TECHNICAL FIELD

The present invention relates to an electrolytic solution that suppresses the generation of $OH^-$ ions or alkalization not to form a strong alkaline solution having a pH of 10 or more even in the case of electrochemical changes, and consequently reduces deterioration or corrosion of resin, rubber, or metal used as a sealing material of electrochemical devices to improve the reliability of the electrochemical devices, and to an electrolyte used in the electrolytic solution and an electrochemical device comprising the electrolytic solution.

BACKGROUND ART

Electric double layer capacitors have dramatically large electric storage capacities as compared with conventional condensers (or capacitors) such as electrolytic condensers, and are beginning to be used in fields in which capacitors have not been used, for example, for assisting power sources. Such capacitors have been used particularly for energy regeneration of automobiles and similar purposes and are beginning to contribute to energy-saving society.

Meanwhile, in condensers including electrolysis condensers and electrochemical devices including electric double layer capacitors, the electrolytic solution contains, as the electrolyte, a quaternary ammonium salt or the like. When a voltage is applied to such an electrochemical device as an electric double layer capacitor, a trace amount of water in the electrolytic solution is reduced together with oxygen to generate $OH^-$ ions (hydroxide ions) around the negative electrode, and the electrolytic solution gradually comes to show strong alkaline. The $OH^-$ ions may cause resin, rubber, metal, or the like of a sealing portion of the negative electrode to corrode, resulting in leakage of the electrolytic solution. This unfortunately reduces the reliability of the electrochemical device.

The generated hydroxide ions are supposed to form a salt corresponding to the electrolyte used. For example, when an N-ethyl-N-methylpyrrolidine salt (for example, a tetrafluoroborate salt) is used as the electrolyte, the salt represented by the following formula is supposed to be formed.

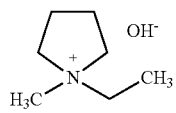

As conventional methods for solving such a problem that an electrolytic solution gradually comes to show strong alkaline by suppressing the generation of $OH^-$ ions around the negative electrode and/or by trapping and eliminating the generated $OH^-$ ions, a method of using an amidine electrolyte to effectively reduce generated $OH^-$ ions (Patent Literature 1 and Patent Literature 2), a method of adding a substance having an alkalization suppressive effect (Patent Literature 3 and Patent Literature 4), and a method of adding a small amount of tetramethylammonium tetrafluoroborate (Patent Literature 5) are disclosed.

In the disclosure according to Patent Literature 1 and Patent Literature 2, when an electrolytic solution containing, as the electrolyte, a quaternary salt having an amidine group is used, defects including liquid leakage due to deterioration of a sealing rubber are not observed at the time of constant-current electrolysis, and $OH^-$ ions are effectively suppressed as compared with a conventional electrolytic solution containing a quaternary ammonium salt as the electrolyte. However, the electrolytic solution containing such a quaternary salt having an amidine group typically has a low withstand voltage as compared with those containing quaternary ammonium salts and is used in a limited voltage range. Hence, it is difficult to apply such an electrolytic solution to future electrochemical devices intended to have higher capacity and higher performance.

Patent Literature 3 describes that the reaction consumes electrolyte itself and the lowered concentration of the electrolyte concentration may gradually reduce the performance. Patent Literature 4 describes that the electrolytic solution contains a substance unnecessary for the capacitor performance. In addition, the substance itself is electrochemically active (easily undergoes redox) in conditions where a voltage is applied, thus easily causes electrolysis or the like, and may reduce the capacitor performance.

In the method according to Patent Literature 5, in addition to a quaternary ammonium as the main electrolyte, a small amount of tetramethylammonium tetrafluoroborate, which is also a quaternary ammonium salt (electrolyte), is added to lower the resistance of the electrolytic solution, and this suppresses the electrolysis, thus accessorily suppressing alkalization (reducing the alkalization rate). This method is not effective in suppressing alkalization.

CITATION LIST

Patent Literature

Patent Literature 1: WO 95/15572
Patent Literature 2: JP 08-321439 A
Patent Literature 3: JP 2014-99443 A
Patent Literature 4: JP 2009-65062 A
Patent Literature 5: JP 2012-69931 A

SUMMARY OF INVENTION

Technical Problem

In view of the above circumstances, the present invention is intended to provide an electrolytic solution that suppresses increase in the $OH^-$ ion concentration even in the case of electrochemical changes, thereby reduces deterioration or corrosion of resin, rubber, or metal, and improves the reliability of an electrochemical device; to provide an electrolyte used in the electrolytic solution; and to provide an electrochemical device comprising the electrolytic solution.

Solution to Problem

As a result of intensive studies to solve the above problems, the inventors of the present invention have found that an electrolyte containing a particular compound (for example, a quaternary ammonium salt) does not cause high alkalization of an electrolytic solution containing the electrolyte when a voltage is applied to the electrolytic solution, that is, the electrolyte has a high alkalization suppressive effect. The inventors conducted further intensive studies, and completed the present invention.

A composition (electrolyte composition) of the present invention comprises a compound having a cation unit represented by Formula (1) and an electrolyte.

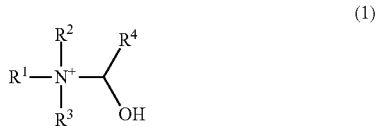
(1)

[In the formula, $R^1$, $R^2$, $R^3$, and $R^4$ are the same or different and represent an alkyl group or an alkoxyalkyl group; $R^1$ and $R^2$ together optionally form a ring; $R^3$ and $R^4$ together optionally form a ring; and $R^1$ is optionally a cationic group represented by Formula (X):

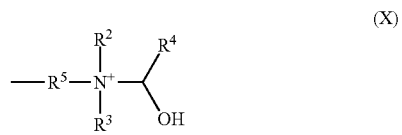
(X)

(wherein $R^5$ represents an alkylene group; and $R^2$, $R^3$, and $R^4$ are as defined above).]

In Formula (1), $R^1$ and $R^2$ may be independently a $C_{1-6}$ alkyl group or a $C_{1-4}$ alkoxy $C_{1-6}$ alkyl group, and $R^3$ and $R^4$ may together form a ring.

The cation unit represented by Formula (1) may be typically a cation unit represented by Formula (1A).

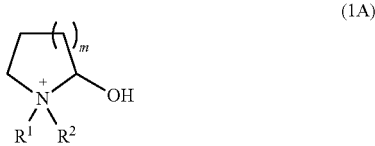
(1A)

(In the formula, m represents an integer of 1 or 2; and $R^1$ and $R^2$ are as defined above.)

The cation unit represented by Formula (1) (or (1A)) may be specifically a cation unit in which $R^1$ is a methyl group or a cation unit in which $R^1$ is a methyl group and $R^2$ is an ethyl group.

In the electrolyte composition of the present invention, the electrolyte may be, for example, a compound having a quaternary ammonium cation unit (or a quaternary ammonium salt) and may be typically a compound having a cation unit represented by Formula (2).

(2)

(In the formula, n represents an integer of 1 or 2; and $R^1$ and $R^2$ are as defined above.)

The cation unit represented by Formula (2) may be specifically a cation unit in which $R^1$ is a methyl group or a cation unit in which $R^1$ is a methyl group and $R^2$ is an ethyl group.

In a preferred composition of the present invention, the compound having a cation unit represented by Formula (1) may comprise a compound having a cation unit represented by Formula (1A), and the electrolyte may comprise a compound having a cation unit represented by Formula (2).

The compound having a cation unit represented by Formula (1) and the electrolyte may comprise any anion, and specifically, the anion may be a fluorine-containing anion [or an anion containing fluorine, for example, a tetrafluoroborate ion ($BF_4^-$)].

In the composition of the present invention, the proportion of the compound having a cation unit represented by Formula (1) may be, for example, about $1 \times 10^{-7}$ to 0.1 part by weight relative to 1 part by weight of the electrolyte.

The present invention encompasses an electrolytic solution comprising the above electrolyte composition. Such an electrolytic solution may be typically an electrolytic solution comprising the electrolyte composition and an organic solvent.

In such an electrolytic solution comprising an organic solvent, the organic solvent may be, for example, at least one organic solvent selected from the group consisting of ethylene carbonate, propylene carbonate, dimethyl carbonate, ethyl methyl carbonate, γ-butyrolactone, acetonitrile, and sulfolane.

The present invention encompasses an electrochemical device using the above electrolytic solution (or comprising the above electrolytic solution). Such an electrochemical device may be, for example, an electric double layer capacitor, a lithium ion capacitor, or a lithium ion battery.

The compound having a cation unit represented by Formula (1) can suppress increase in the pH value of an electrolytic solution (or a combination with an electrolyte) as described later.

Hence, the present invention encompasses a pH increase-suppressing agent for suppressing increase in the pH of an electrolytic solution (or a combination with an electrolyte), and the agent comprises the compound having a cation unit represented by Formula (1).

The present invention encompasses a method for suppressing increase in the pH of an electrolytic solution (or a combination with an electrolyte), and the method comprises adding (or mixing) the compound having a cation unit represented by Formula (1) (or a pH increase-suppressing agent comprising the compound having a cation unit represented by Formula (1) to an electrolytic solution.

Many of the compounds having a cation unit represented by Formula (1) are novel compounds. Hence, the present invention encompasses the compound having a cation unit represented by Formula (1). Such a compound may exclude a compound having a cation unit represented by Formula (1) in which $R^1$, $R^2$, and $R^3$ are an isopropyl group, and $R^4$ is an ethyl group.

Advantageous Effects of Invention

An electrolyte and an electrolytic solution of the present invention can suppress increase in the $OH^-$ ion concentration to suppress high alkalization even in the case of electrochemical changes in the electrolytic solution due to, for example, application of voltage, thus reduce deterioration or corrosion of resin, rubber, or metal, and improve the reliability of an electrochemical device. As a result, an electrochemical device comprising the electrolytic solution of the present invention has a higher reliability.

DESCRIPTION OF EMBODIMENTS

Figure 1:
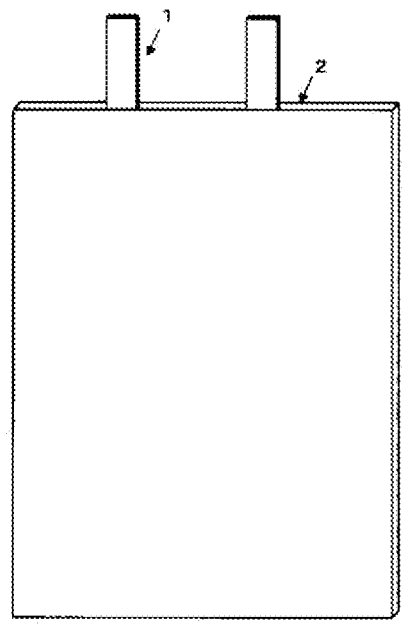
FIG. 1 is an elevation view of a laminate type electric double layer capacitor.

The present invention will now be described in detail.
Electrolyte Composition

An electrolyte composition of the present invention comprises a compound having a particular cation unit and an electrolyte.
Compound Having Cation Unit The compound having a cation unit has a cation unit represented by Formula (1).

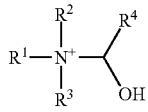
(1)

[In the formula, $R^1$, $R^2$, $R^3$, and $R^4$ are the same or different and represent an alkyl group or an alkoxyalkyl group; $R^1$ and $R^2$ together optionally form a ring; $R^3$ and $R^4$ together optionally form a ring; and $R^1$ is optionally a cationic group represented by Formula (X):

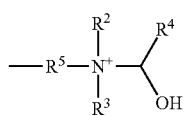
(X)

(wherein $R^5$ represents an alkylene group; and $R^2$, $R^3$, and $R^4$ are as defined above).]

In the cation unit represented by Formula (1), examples of the alkyl group for $R^1$, $R^2$, $R^3$, and $R^4$ include $C_{1-20}$ alkyl groups (for example, $C_{1-10}$ alkyl groups) such as a methyl group, an ethyl group, an n-propyl group, an isopropyl group, an n-butyl group, an isobutyl group, a tert-butyl group, and a sec-butyl group. Of them, preferred are $C_{1-6}$ alkyl groups, more preferred are $C_{1-4}$ alkyl groups, and still more preferred are a methyl group and an ethyl group.

Examples of the alkoxyalkyl group for $R^1$, $R^2$, $R^3$, and $R^4$ include $C_{1-10}$ alkoxy $C_{1-20}$ alkyl groups (for example, $C_{1-8}$ alkoxy $C_{1-10}$ alkyl groups) such as a methoxymethyl group, an ethoxymethyl group, a propoxymethyl group, a methoxyethyl group, and an ethoxyethyl group. Of them, preferred are $C_{1-6}$ alkoxy $C_{1-6}$ alkyl groups, more preferred are $C_{1-4}$ alkoxy $C_{1-6}$ alkyl groups, and still more preferred are $C_{1-4}$ alkoxymethyl groups, such as a methoxymethyl group and an ethoxymethyl group.

In the cation unit represented by Formula (1), $R^1$ and $R^2$ may together form a ring, and $R^3$ and $R^4$ may together form a ring.

Such a ring is not particularly limited as long as an alkyl group or an alkoxyalkyl group [or a group corresponding to such a group, for example, an alkylene group (a $C_{2-6}$ alkylene group such as an ethylene group, a trimethylene group, a propylene group, and a tetramethylene group, preferably a $C_{2-4}$ alkylene group, more preferably a $C_{2-3}$ alkylene group)] as a linking group forms a ring together with a nitrogen atom. Examples of the ring include an azetidine ring, a pyrrolidine ring, a piperidine ring, an azacycloheptane ring (an azahexamethyleneimine ring), and an azacycloheptane ring. A pyrrolidine ring and a piperidine ring are preferred, and a pyrrolidine ring is particularly preferred.

In the cation unit represented by Formula (1), $R^1$ and $R^2$ and/or $R^3$ and $R^4$ may form a ring(s), and particularly, at least $R^3$ and $R^4$ may form a ring. Typical examples of such a cation unit in which $R^3$ and $R^4$ form a ring include a cation unit represented by Formula (1A).

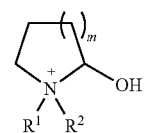
(1A)

(In the formula, m represents an integer of 1 or 2; and $R^1$ and $R^2$ are as defined above.)

Typical examples of the cation unit in which $R^1$ and $R^2$ form a ring and $R^3$ and $R^4$ form a ring include a cation unit represented by Formula (1A) in which $R^1$ and $R^2$ form a ring, such as a cation unit represented by Formula (1A-1).

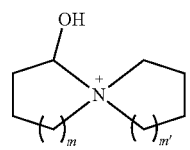
(1A-1)

(In the formula, m' represents an integer of 1 or 2, and m is as defined above.)

The cation unit represented by Formula (1) in which $R^1$ is the group represented by Formula (X) is a cation unit represented by Formula (1X).

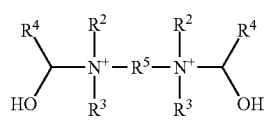
(IX)

(In the formula, $R^2$, $R^3$, $R^4$, and $R^5$ are as defined above.)

In the cation unit represented by Formula (1X), examples of the alkylene group (or the alkylidene group) for $R^5$ include $C_{1-20}$ alkylene groups such as a methylene group, an ethylene group, a trimethylene group, a propylene group, a tetramethylene group, a pentamethylene group, and a hexamethylene group, and the alkylene group is preferably a $C_{2-10}$ alkylene group, more preferably a $C_{2-6}$ alkylene group, and particularly preferably a $C_{2-4}$ alkylene group.

In the cation unit represented by Formula (1X), two $R^2$s may be the same or different, two $R^3$s may be the same or different, and two $R^4$s may be the same or different. As described above, $R^3$ and $R^4$ may together form a ring. Typical examples of such a cation unit in which $R^3$ and $R^4$ form a ring include a cation unit represented by Formula (1XA).

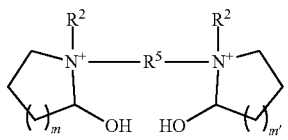

(1XA)

(In the formula, m, m', $R^2$, and $R^5$ are as defined above.)

Specific examples of the cation unit represented by Formula (1) include 2-hydroxy-N,N-dialkylpyrrolidiniums (units of Formula (1A) in which m is 1, and $R^1$ and $R^2$ are alkyl groups, for example, 2-hydroxy-N,N-di-$C_{1-6}$ alkylpyrrolidiniums such as 2-hydroxy-N,N-dimethylpyrrolidinium, 2-hydroxy-N,N-diethylpyrrolidinium, 2-hydroxy-N-ethyl-N-methylpyrrolidinium, 2-hydroxy-N-methyl-N-propylpyrrolidinium, 2-hydroxy-N-butyl-N-methylpyrrolidinium, and 2-hydroxy-N-ethyl-N-propylpyrrolidinium), 2-hydroxy-N-alkyl-N-alkoxyalkylpyrrolidiniums (units of Formula (1A) in which m is 1, $R^1$ is an alkyl group, and $R^2$ is an alkoxyalkyl group, for example, 2-hydroxy-N—$C_{1-6}$ alkyl-N—$C_{1-4}$ alkoxy $C_{1-6}$ alkyl pyrrolidiniums such as 2-hydroxy-N-methyl-N-methoxymethylpyrrolidinium, 2-hydroxy-N-methyl-N-ethoxymethylpyrrolidinium, 2-hydroxy-N-ethyl-N-methoxymethylpyrrolidinium, and 2-hydroxy-N-ethyl-N-ethoxymethylpyrrolidinium; and 2-hydroxy-N—$C_{1-6}$ alkyl-N—$C_{1-4}$ alkoxy $C_{1-6}$ alkylpyrrolidiniums such as 2-hydroxy-N-methyl-N-methoxyethylpyrrolidinium and 2-hydroxy-N-ethyl-N-methoxyethylpyrrolidinium, 2-hydroxy-N-alkoxyalkyl-N-alkoxyalkylpyrrolidiniums (units of Formula (1A) in which m is 1, and $R^1$ and $R^2$ are alkoxyalkyl groups, for example, 2-hydroxy-N—$C_{1-4}$ alkoxy $C_{1-6}$ alkyl-N—$C_{1-4}$ alkoxy $C_{1-6}$ alkylpyrrolidiniums such as 2-hydroxy-N,N-bismethoxymethylpyrrolidinium, 2-hydroxy-N-methoxymethyl-N-methoxyethylpyrrolidinium, 2-hydroxy-N-methoxymethyl-N-ethoxymethylpyrrolidinium, 2-hydroxy-N,N-bisethoxymethylpyrrolidinium, 2-hydroxy-N-ethoxymethyl-N-ethoxyethylpyrrolidinium, and 2-hydroxy-N,N-bismethoxyethylpyrrolidinium), 2-hydroxy-N,N-dialkylpiperidiniums (units of Formula (1A) in which m is 2, and $R^1$ and $R^2$ are alkyl groups, for example, 2-hydroxy-N,N-di-$C_{1-6}$ alkylpiperidiniums such as 2-hydroxy-N,N-dimethylpiperidinium, 2-hydroxy-N-methyl-N-ethylpiperidinium, 2-hydroxy-N-methyl-N-propylpiperidinium, and 2-hydroxy-N-ethyl-N-propylpiperidinium), 2-hydroxy-N-alkyl-N-alkoxyalkylpiperidiniums (units of Formula (LA) in which m is 2, $R^1$ is an alkyl group, and $R^2$ is an alkoxyalkyl group, for example, 2-hydroxy-N—$C_{1-6}$ alkyl-N—$C_{1-4}$ alkoxy $C_{1-6}$ alkylpiperidiniums such as 2-hydroxy-N-methyl-N-methoxymethylpiperidinium, 2-hydroxy-N-methyl-N-ethoxymethylpiperidinium, 2-hydroxy-N-ethyl-N-methoxymethylpiperidinium, and 2-hydroxy-N-ethyl-N-ethoxymethylpiperidinium), 2-hydroxy-N-alkoxyalkyl-N-alkoxyalkylpiperidiniums (units of Formula (LA) in which m is 2, and $R^1$ and $R^2$ are alkoxyalkyl groups, for example, 2-hydroxy-N—$C_{1-4}$ alkoxy $C_{1-6}$ alkyl-N—$C_{1-4}$ alkoxy $C_{1-6}$ alkylpiperidiniums such as 2-hydroxy-N,N-bismethoxymethylpiperidinium, 2-hydroxy-N,N-bisethoxymethylpiperidinium, 2-hydroxy-N,N-bismethoxymethylpiperidinium, 2-hydroxy-N,N-bisethoxymethylpiperidinium, 2-hydroxy-N-methoxymethyl-N-methoxyethylpiperidinium, 2-hydroxy-N-methoxymethyl-N-ethoxymethylpiperidinium, 2-hydroxy-N-methoxymethyl-N-ethoxyethyl-piperidinium, and 2-hydroxy-N-ethoxymethyl-N-ethoxyethyl-piperidinium), 2-hydroxy-1,1'-spiro-bispyrrolidinium, 2-hydroxy-1,1'-spiro-bispiperidinium, cations of bis(2-hydroxy-N-alkylpyrrolidinyl)alkanes [for example, bis(2-hydroxy-N—$C_{1-6}$ alkylpyrrolidinyl) $C_{1-6}$ alkanes such as bis(2-hydroxy-N-methylpyrrolidinyl)methane, 1,2-bis(2-hydroxy-N-methylpyrrolidinyl)ethane, 1,3-bis(2-hydroxy-N-methylpyrrolidinyl)propane, 1,4-bis(2-hydroxy-N-methylpyrrolidinyl)butane, and 1,2-bis(2-hydroxy-N-ethylpyrrolidinyl)ethane], and cations of bis(2-hydroxy-N-alkoxyalkylpyrrolidinyl)alkanes [for example, bis(2-hydroxy-N—$C_{1-4}$ alkoxy $C_{1-6}$ alkylpyrrolidinyl) $C_{1-6}$ alkanes such as bis(2-hydroxy-N-methoxymethylpyrrolidinyl)methane and 1,4-bis(2-hydroxy-N-ethoxymethylpyrrolidinyl)butane].

Of them, particularly preferred are cations in which one of $R^1$ and $R^2$ is an alkyl group (for example, a methyl group, an ethyl group), for example, cations in which $R^1$ is a methyl group, and $R^2$ is a methyl group or an ethyl group (particularly an ethyl group), such as 2-hydroxy-N,N-dimethylpyrrolidinium and 2-hydroxy-N-ethyl-N-methylpyrrolidinium.

Many of the compounds having a cation unit represented by Formula (1), including 2-hydroxy-N-ethyl-N-methylpyrrolidinium, are novel compounds.

Hence, the present invention also encompasses such novel compounds.

The cation units may be used singly or in combination of two or more of them.

The compound having the cation unit may be in any form in the electrolyte composition as long as the compound has a unit represented by Formula (1), and, for example, may form a salt together with an anion (counter anion) in the electrolyte composition. In the composition, the salt may be ionized.

In the present invention, an electrolyte is used in addition to the compound having a cation unit, but the compound having a cation unit may also function as an electrolyte.

Specific examples of the anion include halogen anions (or halide ions, chlorine, bromine, iodine, or ions thereof, for example), fluorine-containing anions [tetrafluoroborate ion ($BF_4^-$), hexafluorophosphate ion ($PF_6^-$), hexafluoroantimonate ion ($SbF_6^-$), $CF_3CO_2^-$, $CF_3SO_3^-$, $N(FSO_2)_2^-$, $N(CF_3SO_2)_2^-$, $N(CF_3CF_2SO_2)_2^-$, $N(FSO_2)$ $(CF_3SO_2)^-$, $N(CF_3SO_2)$ $(CF_3CF_2SO_2)^-$, C $(CF_3SO_2)_3^-$, $N(CF_3SO_2)$ $(CF_3CO)^-$, $CF_3BF_3^-$, $C_2F_5BF_3^-$, $(CF_3)_2BF_2^-$, $(CF_3)$ $(C_2F_5)$ $BF_2^-$, $(C_2F_5)_2BF_2^-$, $(CF_3)_3BF^-$, and the like], anions of inorganic acids (phosphate ion, borate ion, perchlorate ion, and the like), and anions of organic acids [for example, monocarboxylic acids (including aliphatic monocarboxylic acids such as formic acid, acetic acid, propionic acid, stearic acid, acrylic acid, and oleic acid; and aromatic monocarboxylic acids such as benzoic acid and salicylic acid), polycarboxylic acids (including aliphatic polycarboxylic acids such as oxalic acid, malonic acid, and maleic acid; and aromatic polycarboxylic acids such as phthalic acid and terephthalic acid)].

In the composition, the anions may be used singly or in combination of two or more of them.

Of these anions, halogen anions and fluorine-containing anions are preferred, and a tetrafluoroborate ion ($BF_4$) is particularly preferred.

The compounds having a cation unit may be used singly or in combination of two or more of them.

The compound having a cation unit (or a cation unit) can be produced by a common technique, and the production method is not limited to particular methods. For example, the compound can be produced by quaternization of a 2-hydroxy tertiary amine prepared by a method according to Korean Patent KR1325589. The quaternization method may be a known method, and the 2-hydroxy tertiary amine can be reacted with a halogenated alkyl, for example.

Electrolyte

The electrolyte may be any electrolyte that is not included in the above compound having a cation unit but functions as an electrolyte, and examples thereof include compounds having a quaternary ammonium cation unit (quaternary ammonium salts).

Examples of the quaternary ammonium cation unit include chain ammonium units [tetraalkylammoniums (for example, tetra $C_{1-6}$ alkylammoniums such as tetraethylammonium, triethylmethylammonium, trimethylpropylmethylammonium, and dimethyldiethylammonium), alkylalkoxyalkylammoniums (for example, tri $C_{1-6}$ alkyl mono $C_{1-4}$ alkoxy $C_{1-6}$ alkylammoniums such as N,N,N-trimethyl-N-methoxymethylammonium and N-ethyl-N,N-dimethyl-N-methoxymethylammonium)], cyclic ammonium units [for example, imidazole cations (including mono to tetra $C_{1-6}$ alkylimidazoliums such as 1,3-dimethylimidazolium, 1,2,3-trimethylimidazolium, and 1,3-dimethyl-2-phenylimidazolium), pyrrolidine cations, and piperidine cations].

Of them, a compound having a pyrrolidine cation or a piperidine cation, for example, having a cation unit represented by Formula (2), may be particularly preferably used.

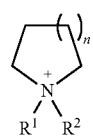

(2)

(In the formula, n represents an integer of 1 or 2; and $R^1$ and $R^2$ are as defined above.)

In the cation unit represented by Formula (2), $R^1$ and $R^2$ are the same as in the cation unit represented by Formula (1), that is, an alkyl group or an alkoxyalkyl group, and may form a ring.

Preferred alkyl groups and alkoxyalkyl groups are also the same as in the above.

Typical examples of the alkyl group for $R^1$ and $R^2$ include $C_{1-20}$ alkyl groups (for example, $C_{1-10}$ alkyl groups) such as a methyl group, an ethyl group, an n-propyl group, an isopropyl group, an n-butyl group, an isobutyl group, a tert-butyl group, and a sec-butyl group, and the alkyl group is preferably a $C_{1-6}$ alkyl group and more preferably a $C_{1-4}$ alkyl group. Of these groups, a methyl group or an ethyl group is preferred.

Examples of the alkoxyalkyl group for $R^1$ and $R^2$ include $C_{1-10}$ alkoxy $C_{1-20}$ alkyl groups (for example, $C_{1-8}$ alkoxy $C_{1-10}$ alkyl groups) such as a methoxymethyl group, an ethoxymethyl group, a propoxymethyl group, a methoxyethyl group, and an ethoxyethyl group, and the alkoxyalkyl group is preferably a $C_{1-6}$ alkoxy $C_{1-6}$ alkyl group and more preferably a $C_{1-4}$ alkoxy $C_{1-4}$ alkyl group. Of these groups, a $C_{1-4}$ alkoxymethyl group, such as a methoxymethyl group and an ethoxymethyl group, is preferred.

Specific examples of the cation unit represented by Formula (2) include

N,N-dialkylpyrrolidiniums (cation units represented by Formula (2) in which n is 1, and $R^1$ and $R^2$ are alkyl groups, for example, N,N-di-$C_{1-6}$ alkylpyrrolidiniums such as N,N-dimethylpyrrolidinium, N,N-diethylpyrrolidinium, N-ethyl-N-methylpyrrolidinium, N-methyl-N-propylpyrrolidinium, N-butyl-N-methylpyrrolidinium, and N-ethyl-N-propylpyrrolidinium), N-alkyl-N-alkoxyalkylpyrrolidiniums (cation units represented by Formula (2) in which n is 1, $R^1$ is an alkyl group, $R^2$ is an alkoxyalkyl group, for example, N—$C_{1-6}$ alkyl-N—$C_{1-4}$ alkoxy $C_{1-6}$ alkylpyrrolidiniums such as N-methyl-N-methoxymethylpyrrolidinium, N-methyl-N-ethoxymethylpyrrolidinium, N-ethyl-N-methoxymethylpyrrolidinium, and N-ethyl-N-ethoxymethylpyrrolidinium), N,N-bis(alkoxyalkyl)pyrrolidiniums (cation units represented by Formula (2) in which n is 1, and $R^1$ and $R^2$ are alkoxyalkyl groups, for example, N—$C_{1-6}$ alkyl-N—$C_{1-4}$ alkoxy $C_{1-6}$ alkylpyrrolidiniums such as N-methyl-N-methoxyethylpyrrolidinium and N-ethyl-N-methoxyethylpyrrolidinium, N—$C_{1-4}$ alkoxy $C_{1-6}$ alkyl-N—$C_{1-4}$ alkoxy $C_{1-6}$ alkylpyrrolidiniums such as N,N-bismethoxymethylpyrrolidinium, N-methoxymethyl-N-methoxyethylpyrrolidinium, N-methoxymethyl-N-ethoxymethylpyrrolidinium, N,N-bisethoxymethylpyrrolidinium, and N,N-bismethoxyethylpyrrolidinium), N,N-dialkylpiperidiniums (cation units represented by Formula (2) in which n is 2, and $R^1$ and $R^2$ are alkyl groups, for example, N,N-di-$C_{1-6}$ alkylpiperidiniums such as N,N-dimethylpiperidinium, N-methyl-N-ethylpiperidinium, N-methyl-N-propylpiperidinium, and N-ethyl-N-propylpiperidinium), N-alkyl-N-alkoxyalkylpiperidiniums (cation units represented by Formula (2) in which n is 2, $R^1$ is an alkyl group, and $R^2$ is an alkoxyalkyl group, for example, N—$C_{1-6}$ alkyl-N—$C_{1-4}$ alkoxy $C_{1-6}$ alkylpiperidiniums such as N-methyl-N-methoxymethylpiperidinium, N-methyl-N-ethoxymethylpiperidinium, N-ethyl-N-methoxymethylpiperidinium, and N-ethyl-N-ethoxymethylpiperidinium), and N,N-bis(alkoxyalkyl)piperidiniums (cation units represented by Formula (2) in which n is 1, and $R^1$ and $R^2$ are alkoxyalkyl groups, for example, N—$C_{1-4}$ alkoxy $C_{1-6}$ alkyl-N—$C_{1-4}$ alkoxy $C_{1-6}$ alkylpiperidiniums such as N-methyl-N-methoxyethylpiperidinium and N-ethyl-N-methoxyethylpiperidinium, N—$C_{1-4}$ alkoxy $C_{1-6}$ alkyl-N—$C_{1-4}$ alkoxy $C_{1-6}$ alkylpiperidiniums such as N,N-bis(methoxymethyl)piperidinium, N-methoxymethyl-N-methoxyethylpiperidinium, N-methoxymethyl-N-ethoxymethylpiperidinium, N,N-bis(ethoxymethyl)piperidinium, and N,N-bis(methoxyethyl)piperidinium).

Of them, preferred are cation units represented by Formula (2) in which one of $R^1$ and $R^2$ is an alkyl group (for example, a methyl group, an ethyl group), for example, cations in which $R^1$ is a methyl group, and $R^2$ is a methyl group or an ethyl group (particularly an ethyl group), such as N,N-dimethylpyrrolidinium and N-ethyl-N-methylpyrrolidinium. N-Ethyl-N-methylpyrrolidinium is particularly preferred.

The cation units may be used singly or in combination of two or more of them.

The compound having a quaternary ammonium cation unit (or the electrolyte) may be in any form in the electrolyte composition as long as the compound has a quaternary ammonium cation unit, and, for example, may form a salt together with an anion (counter anion) in the electrolyte composition. In the composition, the salt may be ionized.

Specific examples of the anion include the anions described above. Of them, halogen anions and fluorine-containing anions (anions containing fluorine) are preferred, and a tetrafluoroborate ion ($BF_4^-$) is particularly preferred.

The electrolytes (or the compounds having a quaternary ammonium cation unit) may be used singly or in combination of two or more of them.

The electrolyte used may be a commercial product or an electrolyte produced by a known method (for example, a method according to JP 08-31401 B).

In the electrolyte composition, the proportion of the compound having a cation unit represented by Formula (1) is, for example, about 1 part by weight or less (for example, $1 \times 10^{-8}$ to 1 part by weight), preferably 0.1 part by weight or less (for example, $1 \times 10^{-7}$ to 0.1 part by weight), and more preferably 0.01 part by weight or less (for example, $1 \times 10^{-6}$ to 0.01 part by weight) relative to 1 part by weight of the electrolyte.

The electrolyte composition of the present invention may contain various known additives and the like, as needed, in addition to the compound having a cation unit represented by Formula (1) and the electrolyte, as long as the effect of the invention is exerted.

Electrolytic Solution

The present invention encompasses an electrolytic solution comprising the above electrolyte composition of the present invention. Such an electrolytic solution does not necessarily comprise an organic solvent when, for example, the electrolyte composition is a liquid (an ionic liquid), but typically may comprise an organic solvent.

Such an electrolytic solution comprising an organic solvent can be produced by dissolving the electrolyte composition of the present invention in an organic solvent. The method for preparing an electrolytic solution by dissolving an electrolyte composition in an organic solvent has been sufficiently established, and the present invention can follow the prior art.

The electrolytic solution may be prepared in any environment that no atmospheric air enters because water and oxygen adversely affect the performance of an electric double layer capacitor, and the working environment preferably has a dew point of −30° C. or less. When the dew point is higher than −30° C., an electrolytic solution absorbs water in the atmosphere with the passage of working time, and the water content increases in the electrolytic solution. The water content in an electrolytic solution can be determined with a Karl Fischer moisture meter, and the water content is preferably 100 ppm or less, for example.

The organic solvent used in the present invention is not limited to particular organic solvents, and examples thereof include ethylene carbonate, propylene carbonate, dimethyl carbonate, ethyl methyl carbonate, γ-butyrolactone, acetonitrile, and sulfolane. These solvents may be used singly or as a mixture of two or more of them. The organic solvent is preferably propylene carbonate. As such an organic solvent, a commercially available solvent may be used, or a solvent prepared by further purification including distillation may be used, as needed.

In the electrolytic solution (the electrolytic solution containing an organic solvent) of the present invention, the content of the electrolyte or the electrolyte composition is not limited to particular values, and is preferably such a content as not to cause precipitation of the electrolyte composition when the electrolytic solution is used. The content is commonly about 0.1 to 70% by weight, preferably about 1 to 50% by weight, and more preferably about 10 to 30% by weight relative to the total amount of the electrolytic solution.

The electrolytic solution of the present invention may contain lithium salts such as $LiBF_4$ and $LiPF_6$ and other substances, as needed, in addition to the electrolyte composition of the present invention and the organic solvent as long as the effect of the invention is exerted.

The electrolytic solution of the present invention can, as compared with an electrolytic solution not having the compound having a cation unit represented by Formula (1), suppress high alkalization in the case of electrochemical changes due to application of voltage, and the pH value does not reach high alkaline (for example, pH 10≤), for example.

In the present invention, the method of applying voltage to the electrolytic solution is not particularly limited, and a conventionally known method can be used. For example, constant-current electrolysis can be used.

The method of determining alkalinity when voltage is applied to the electrolytic solution is not particularly limited. To determine the pH value during constant-current electrolysis, a common method can be used. For example, the pH value can be determined by a method according to JP 4802243 B.

The electrolytic solution (and the electrolyte composition) of the present invention preferably has a pH of less than 10 when voltage is applied to the electrolytic solution, typically from the start of voltage application to 5 hours after. The pH value is determined in accordance with the method described later in Examples.

Electrochemical Device

The present invention encompasses an electrochemical device comprising the above electrolytic solution of the present invention.

The electrical device is not limited to particular devices, and examples thereof include an electric double layer capacitor, a lithium ion capacitor, a lithium ion battery, a solar cell, and a fuel cell. Preferred are an electric double layer capacitor, a lithium ion capacitor, and a lithium ion battery, for example.

The electrochemical device of the present invention may be any devices comprising the electrolytic solution of the present invention as the electrolytic solution. The electrochemical device may be produced by any methods, and a known method can be used. The method for producing an electrochemical device comprising an electrolytic solution has been sufficiently established, and the present invention can follow the prior art. The electrochemical device of the present invention can be produced by a known method, for example, a method according to JP 5430464 B, JP 5063172 B, JP 5439009 B, JP 2012-18916 A, JP 8-107048 A, JP 2013-20835 A, or the like.

The electrochemical device of the present invention comprises the above electrolytic solution of the present invention, and therefore, can suppress increase in the $OH^-$ ion concentration of the electrolytic solution to suppress high alkalization of the electrolytic solution even in the case of electrochemical changes in the electrolytic solution due to, for example, application of voltage, thus reduce deterioration or corrosion of resin, rubber, or metal, and improve the reliability of the electrochemical device.

Electric Double Layer Capacitor

When an electric double layer capacitor is produced as the electrochemical device, an example of the electric double layer capacitor is a laminate type. However, the shape of the electric double layer capacitor is not limited to the laminate type, and may be a stacked type in which stacked electrodes are stored in a can, a winding type in which electrodes are wound and stored, or what is called a coin type comprising metal cans that are electrically insulated by insulating gaskets. As an example, the structure of a laminate type electric double layer capacitor will next be described.

Figure 2:
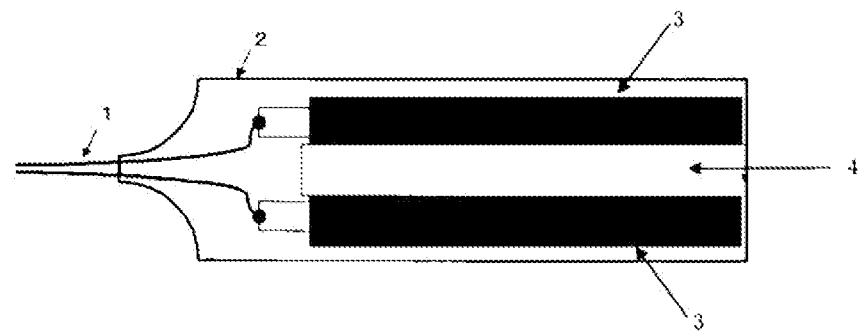
FIG. 2 is a view showing the inner structure of the laminate type electric double layer capacitor.

FIG. 1 and FIG. 2 are views showing a laminate type electric double layer capacitor. In the capacitor, capacitor electrodes 3 are bonded to aluminum tabs 1, and the two electrodes 3 facing each other with a separator 4 interposed therebetween are stored in a laminate 2. Each electrode comprises a polarizable electrode portion made from a carbon material such as activated carbon and a current collector portion. The laminate container 2 is sealed by thermocompression so as to prevent water or air from entering from the outside of the container.

The material of the polarizable electrode preferably has a large specific surface area and a high electrical conductivity and is required to be electrochemically stable in an electrolytic solution within a range of applied voltage. Examples of such a material include carbon materials, metal oxide materials, and electrically conductive polymer materials. In consideration of cost, the polarizable electrode material is preferably a carbon material.

The carbon material is preferably an activated carbon material, and specific examples thereof include sawdust activated carbon, coconut shell activated carbon, pitch/coke activated carbon, phenol resin activated carbon, polyacrylonitrile activated carbon, and cellulose activated carbon.

Examples of the metal oxide material include ruthenium oxide, manganese oxide, and cobalt oxide. Examples of the electrically conductive polymer material include a polyaniline film, a polypyrrole film, a polythiophene film, and a poly(3,4-ethylenedioxythiophene) film.

The electrode can be prepared by a known technique. For example, the polarizable electrode material is kneaded with a binder such as PTFE (polytetrafluoroethylene), then the mixture is formed under pressure, and the formed material is bonded to a current collector such as aluminum foil with an electrically conductive adhesive. Alternatively, the polarizable electrode material together with a binder is mixed with a thickener such as CMC (carboxymethylcellulose) or with an organic solvent such as pyrrolidone, and the resulting paste is applied to a current collector such as aluminum foil and then dried, giving an electrode.

The separator preferably has high electron insulating properties, excellent wettability with an electrolytic solution, and high ion permeability, and is required to be electrochemically stable within a range of applied voltage. The separator may be made from any material, and paper made from rayon, Manila hemp, or the like; a polyolefinic porous film; a polyethylene nonwoven fabric; a polypropylene nonwoven fabric; and the like are preferably used.

Lithium Ion Capacitor

A lithium ion capacitor as the electrochemical device is, for example, a capacitor in which electrodes facing each other with a separator interposed therebetween and an electrolytic solution are stored in a container. In the capacitor, the positive electrode is an activated carbon, the negative electrode is a carbon material that can absorb and desorb ionized lithium and has lithium absorbed in advance, and the electrolytic solution is a nonaqueous electrolytic solution.

The lithium ion capacitor comprises two types of electrodes. One of the polarizable electrodes comprises a carbon material that can absorb and desorb ionized lithium, and functions as the negative electrode, and the other of the polarizable electrodes comprises an activated carbon that can absorb anions, and functions as the positive electrode. The positive electrode preferably comprises an activated carbon and a conductive agent imparting electronic conductivity.

As for the carbon materials constituting the electrodes, examples of the activated carbon usable for the positive electrode include coconut shell activated carbon and petroleum coke activated carbon.

Examples of the conductive agent imparting electronic conductivity include highly conductive carbon black, acetylene black, natural graphite, and artificial graphite. The amount of such a conductive agent can be 1 to 50% by weight of the activated carbon.

Examples of the carbon material that is the main constituent material of the negative electrode and can absorb and desorb ionized lithium include natural graphite, artificial graphite, graphitized mesophase carbon microspheres, graphitized mesophase carbon fibers, graphite whisker, graphitized carbon fibers, a pyrolysate of a furfuryl alcohol resin, a pyrolysate of a novolac resin, and pyrolysates of condensed polycyclic hydrocarbon compounds, such as pitch and coke.

The electrodes can be produced by a known technique. For example, for the positive electrode, the activated carbon powder, a conductive agent, and a binder such as polytetrafluoroethylene are kneaded in the presence of an alcohol and formed into a sheet-shaped material, and then the sheet-shaped material is dried to give a polarizable electrode for the positive electrode.

Of the electrodes, the negative electrode mainly comprising a carbonaceous material that can absorb and desorb ionized lithium and has lithium absorbed in advance preferably comprises a carbon material capable of absorbing ionized lithium and a binder. The negative electrode can be prepared by the following procedure, for example.

A powder of a carbon material capable of absorbing ionized lithium and a binder are kneaded in the presence of an alcohol and formed into a sheet-shaped material, and then the sheet-shaped material is dried to give a negative electrode. Next, the negative electrode is bonded to a current collector with an electrically conductive adhesive or the like, and the negative electrode in contact with a lithium foil is enclosed in a container and then warmed to allow the carbon material to absorb lithium. The amount of the binder can be 0.5 to 20% by weight.

The separator preferably has high insulating properties, excellent wettability with an electrolytic solution, and high ion permeability, and an electrochemically stable separator is preferred. The material is not particularly limited, and cellulose (paper), a polyolefinic porous film, and the like are preferred.

When the electrolytic solution of the present invention is used in the lithium ion capacitor produced as above, the electrolytic solution can contain a lithium salt such as $LiBF_4$ and $LiPF_6$. Such a lithium salt is preferably so added to an electrolytic solution containing the compound represented by Formula (1) as to give 0.1 to 2.5 mol/L and more preferably 0.2 to 2.0 mol/L.

Lithium Ion Battery

A lithium ion battery as the electrochemical device is a secondary battery having a negative electrode capacity that is represented by absorption of lithium as the electrode reaction substance and a capacity component depending on the winding, and comprises, in a metal or film exterior member, a positive electrode and a negative electrode facing each other with a separator interposed therebetween and the nonaqueous electrolytic solution or the nonaqueous electrolyte. Examples thereof include a lithium ion battery having the structure in which a wound electrode assembly to which a positive electrode lead and a negative electrode lead are attached is stored in a film exterior member.

The positive electrode can be prepared as follows: a positive electrode active material, a binder, and a conductive agent are mixed to prepare a positive electrode mixture; the positive electrode mixture is dispersed in a solvent such as N-methyl-2-pyrrolidone to give a slurry; and the slurry is applied to a positive electrode collector, then dried, and subjected to compression molding.

The positive electrode active material comprises one or more positive electrode materials capable of absorbing lithium as the electrode reaction substance and being wound, and examples thereof include lithium-containing compounds such as lithium composite oxides, lithium phosphate, lithium sulfide, and intercalation compounds containing lithium.

Examples of the binder include synthetic rubbers such as styrene-butadiene rubber, fluororubber, and ethylene-propylene-diene rubber; and polymer materials such as polyvinylidene fluoride.

Examples of the conductive agent include carbon materials such as graphite and carbon black, and these agents may be used singly or as a mixture of two or more of them.

The negative electrode can be prepared as follows: a negative electrode active material and a binder are mixed to prepare a negative electrode mixture; the negative electrode mixture is dispersed in a solvent such as N-methyl-2-pyrrolidone to give a slurry; and the slurry is applied to a negative electrode collector, then dried, and subjected to compression molding.

The negative electrode active material comprises a negative electrode material capable of absorbing lithium as the electrode reaction substance and being wound, and examples thereof include materials containing at least one of metal elements and metalloid elements as the constituent element. Examples of such a material include lithium metal, and a material that forms an alloy with the lithium metal may also be used.

As the binder, those exemplified above for the positive electrode can be used.

The prepared positive electrode and the negative electrode are stacked with a separator interposed therebetween, then the whole is wound to form a wound electrode assembly, and the electrode assembly is stored in an exterior member. Subsequently, an electrolytic solution is poured in the exterior member, and then openings of the exterior member are sealed to give a battery.

Examples of the separator include porous membranes of a synthetic resin such as polytetrafluoroethylene, polypropylene, and polyethylene, and ceramic porous membranes.

When the electrolytic solution of the present invention is used in the lithium ion battery prepared as above, the electrolytic solution can contain a lithium salt such as $LiBF_4$ and $LiPF_6$. Such a lithium salt is preferably so added to the electrolytic solution as to give 0.1 to 2.5 mol/L and more preferably 0.2 to 2.0 mol/L.

EXAMPLES

The present invention will be specifically described with reference to the following examples and comparative examples, but the present invention is not limited to them. Alkalization Test (Measurement of pH Value)

By constant-current electrolysis of an electrolytic solution, voltage was applied to the electrolytic solution.

As a measure of the alkalinity of an electrolytic solution during the constant-current electrolysis, pH value was used as an index. For the constant-current electrolysis at the negative electrode (cathode), 20 mL of an electrolytic solution was poured in each of a negative electrode chamber and a positive electrode chamber of an H-type cell in the atmosphere at room temperature, and a 3-$cm^2$ platinum plate was used as the electrode. The electrolysis was performed at 50 mA. From the start of the electrolysis, time-dependent pH changes around the negative electrode were recorded. For the pH value measurement, a pH meter manufactured by HORIBA was used.

Example 1: Synthesis of
2-hydroxy-N-ethyl-N-methylpyrrolidinium
tetrafluoroborate (2-OH-EMPy-BF4)

(1) 2-Hydroxy-N-methylpyrrolidine

In accordance with a method described in Korean Patent KR 1325589, 2-hydroxy-N-methylpyrrolidine was prepared. That is, in a 300-ml reaction container, 20.95 g of N-methylpyrrolidone was dissolved in 120 mL of absolute methanol, and 4 g of sodium borohydride was gradually added. After the completion of the addition, the mixture was stirred for 2 hours. The resulting solution was cooled to 0° C., and 50 mL of water was gradually added. To the mixture, 200 mL of dichloromethane was added for extraction, and the dichloromethane was separated from the aqueous phase. The obtained dichloromethane solution was concentrated to give 20 g of a crude product containing 2-hydroxy-N-methylpyrrolidine. The crude product was not purified but directly used to the subsequent reaction.

(2) 2-Hydroxy-N-ethyl-N-methylpyrrolidinium
Tetrafluoroborate

With reference to the method in Example 1 in JP 2005-325067 A, the above 2-hydroxy-N-methylpyrrolidine was used in place of TEMA-CL (triethylmethylammonium chloride) in Example 1 to give a target compound.

That is, 1.01 g of the above 2-hydroxy-N-methylpyrrolidine was weighed into a reaction vessel, and was dissolved in 10 mL of acetone added thereto. To the solution, 1.1 g of ethyl bromide was added, and the whole was heated at 80° C. for 8 hours. The resulting 2-hydroxy-N-ethyl-N-methylpyrrolidinium bromide was dissolved in acetone, then 1.26 g of potassium tetrafluoroborate ($KBF_4$) was added, and the whole was stirred at 40° C. for 4 hours.

The reaction solution was analyzed with a liquid chromatograph/mass spectrometer (LC/MS) to confirm the formation of the target compound, 2-hydroxy-N-ethyl-N-methylpyrrolidinium tetrafluoroborate (2-OH-EMPy-BF4), then the reaction solution was filtered, and the filtrate was concentrated. To the resulting residue, propylene carbonate (purity: 99.99%, as determined by GC analysis) was added to give a 1% propylene carbonate solution. The yield of the target compound in the reaction estimated from the consumption amount of the material 2-hydroxy-N-methylpyrrolidine was 50%.

The mass-to-charge ratio, m/Z, obtained from a MASS spectrum of 2-OH-EMPy-BF4 was 130.1241, which was completely identical with the theoretical (calculated value) m/Z (130.12).

Example 2

The same reaction as in Example 1 was performed except that N-ethylpyrrolidone was used in place of N-methylpyrrolidone to give 2-hydroxy-N-ethylpyrrolidine, and from the resulting pyrrolidine, 2-hydroxy-N,N-diethyl-N-methylpyrrolidinium tetrafluoroborate was produced. Yield: 45%.

Example 3

The same reaction as in Example 1 was performed except that methyl iodide was used in place of ethyl bromide in Example 1 to give 2-hydroxy-N,N-dimethylpyrrolidinium tetrafluoroborate. Yield: 55%.

Example 4

The same reaction as in Example 1 was performed except that propyl bromide was used in place of ethyl bromide to give 2-hydroxy-N-methyl-N-propylpyrrolidinium tetrafluoroborate. Yield: 40%.

Example 5

The same reaction as in Example 1 was performed except that butyl bromide was used in place of ethyl bromide to give 2-hydroxy-N-butyl-N-methylpyrrolidinium tetrafluoroborate. Yield: 40%.

Example 6

The same reaction as in Example 1 was performed except that dibromobutane was used in place of ethyl bromide to give 2-hydroxy-1,1'-spiro-bispyrrolidinium tetrafluoroborate. Yield: 30%.

Example 7

To 100.0 g of highly pure propylene carbonate (purity: 99.9% or more, water content: 100 ppm or less), 99.9 g of N-ethyl-N-methylpyrrolidinium tetrafluoroborate (EMPy-BF4) prepared in accordance with an example in JP 8-31401 B was added, and then 10.0 g of the 1% (W/W) solution of 2-hydroxy-N-ethyl-N-methylpyrrolidinium tetrafluoroborate in propylene carbonate prepared in Example 1 was added to give a solution. The solution was dehydrated and concentrated until the water content reached 100 ppm or less. To the resulting concentrate, highly pure propylene carbonate was added at room temperature in a dry nitrogen atmosphere having a dew point of −40° C. until the concentration of the electrolyte, EMPy-BF4, reached 1.5 mol/L (a solution having an electrolyte concentration of 25%), giving an electrolytic solution. The electrolytic solution was used to perform the above alkalization test.

The propylene carbonate used in Example 1 and Comparative Examples 1 to 3 described later was a precisely distilled, highly pure propylene carbonate (purity: 99.99%, as determined by GC analysis).

Comparative Example 1

At room temperature in a dry nitrogen atmosphere having a dew point of −40° C., N-ethyl-N-methylpyrrolidinium tetrafluoroborate was diluted with propylene carbonate so as to give 1.5 mol/L, giving an electrolytic solution. The electrolytic solution was used to perform the above alkalization test.

Comparative Example 2

At room temperature in a dry nitrogen atmosphere having a dew point of −40° C., commercially available crystals of N, N, N-triethyl-N-methylammonium tetrafluoroborate (TEMA-BF4) (manufactured by cap-chem) were dissolved in propylene carbonate so as to give 1.5 mol/L, giving an electrolytic solution. The electrolytic solution was used to perform the above alkalization test.

Comparative Example 3

At room temperature in a dry nitrogen atmosphere having a dew point of −40° C., crystals of 1,1'-spiro-bispyrrolidinium tetrafluoroborate (SBP-BF4) produced by a known production method were dissolved in propylene carbonate so as to give 1.5 mol/L, giving an electrolytic solution. The electrolytic solution was used to perform the alkalization test.

Comparative Example 4

At room temperature in a dry nitrogen atmosphere having a dew point of −40° C., a commercially available ethylmethylimidazolium tetrafluoroborate (EMI-BF4) (manufactured by Kanto Chemical Co., Inc.) was diluted with propylene carbonate so as to give 1.5 mol/L, giving an electrolytic solution. The electrolytic solution was used to perform the above alkalization test.

Figure 3:
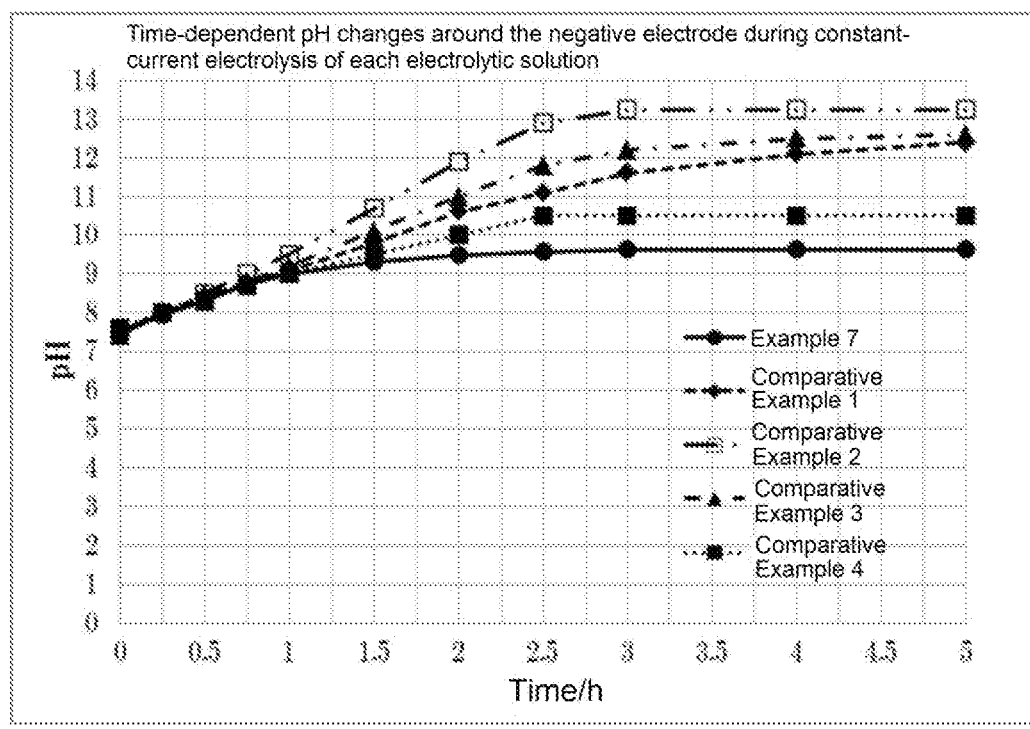
FIG. 3 is a graph showing time-dependent pH changes around the negative electrode (cathode) during constant-current electrolysis in Example 7 and Comparative Examples 1 to 4.

Time-dependent pH changes around each negative electrode (cathode) during constant-current electrolysis in Example 7 and Comparative Examples 1 to 4 are shown in FIG. 3.

The results in FIG. 3 show that the electrolytic solution (Example 7) containing the electrolyte composition of the present invention (i.e., 2-hydroxy-N-ethyl-N-methylpyrrolidinium tetrafluoroborate and N-ethyl-N-methylpyrrolidinium tetrafluoroborate (EMPy-BF4) has a slight alkaline pH even after constant-current electrolysis, has a pH value of 10 or less from the start of the constant-current electrolysis to 5 hours after, and suppresses high alkalization as compared with the electrolytic solution containing EMI-BF4 (Comparative Example 4).

In contrast, current electrolysis of the electrolytic solution containing only N-ethyl-N-methylpyrrolidinium tetrafluoroborate as the electrolyte (Comparative Example 1), the electrolytic solution containing N, N, N-triethyl-N-methylammonium tetrafluoroborate (TEMA-BF4) as the electrolyte (Comparative Example 2), or the electrolytic solution containing 1,1'-spiro-bispyrrolidinium tetrafluoroborate (SBP-BF4) as the electrolyte (Comparative Example 3) results in strong alkalinity as time passes.

As described above, the electrolytic solution of the present invention is revealed to be resistant to alkalization as compared with conventional electrolytic solutions.

INDUSTRIAL APPLICABILITY

In an electrochemical device, the composition according to the present invention can suppress increase in the $OH^-$ ion concentration to suppress high alkalization even in the case of electrochemical changes in the electrolytic solution due to, for example, application of voltage, thus reduce deterioration or corrosion of resin, rubber, or metal, and improve the reliability of the electrochemical device. As a result, the

The invention claimed is:

1. An electrolyte composition comprising:
   a compound having a cation unit represented by Formula (1):

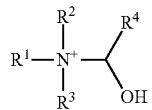
(1)

wherein $R^1$ and $R^2$ are independently a $C_{1-6}$ alkyl group or a $C_{1-4}$ alkoxy $C_{1-6}$ alkyl group, and $R^3$ and $R^4$ together form a ring; and an electrolyte, which is a compound having a quaternary ammonium cation unit.

2. The electrolyte composition according to claim 1, wherein the compound having a cation unit represented by Formula (1) is a compound having a cation unit represented by Formula (1A):

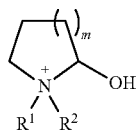
(1A)

wherein m represents an integer of 1 or 2; and $R^1$ and $R^2$ are as defined a $C_{1-6}$ alkyl group or a $C_{1-4}$ alkoxy $C_{1-6}$ alkyl group.

3. The electrolyte composition according to claim 1, wherein, in the compound having a cation unit represented by Formula (1), $R^1$ is a methyl group.

4. The electrolyte composition according to claim 1, wherein, in the compound having a cation unit represented by Formula (1), $R^1$ is a methyl group, and $R^2$ is an ethyl group.

5. The electrolyte composition according to claim 1, wherein the electrolyte is a compound having a cation unit represented by Formula (2):

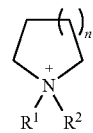
(2)

wherein n represents an integer of 1 or 2; and $R^1$ and $R^2$ are the same or different and each represent an alkyl group or an alkoxyalkyl group; $R^1$ and $R^2$ together optionally form a ring; and $R^1$ is optionally a cationic group represented by Formula (X):

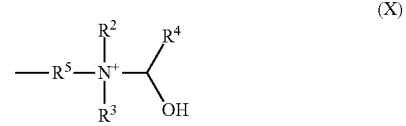
(X)

wherein $R^5$ represents an alkylene group; $R^2$ is an alkyl group or an alkoxyalkyl group, and $R^3$ and $R^4$ are the same or different and each represent an alkyl group or an alkoxyalkyl group; and
   $R^3$ and $R^4$ together optionally form a ring.

6. The electrolyte composition according to claim 1, wherein a proportion of the compound having a cation unit represented by Formula (1) is $1 \times 10^{-7}$ to 0.1 part by weight relative to 1 part by weight of the electrolyte.

7. An electrolytic solution comprising:
   the electrolyte composition according to claim 1; and
   an organic solvent.

8. An electrochemical device comprising the electrolytic solution according to claim 7.

9. The electrochemical device according to claim 8, being an electric double layer capacitor.

10. The electrochemical device according to claim 8, being a lithium ion capacitor.

11. The electrochemical device according to claim 8, being a lithium ion battery.

12. A method for suppressing an increase in the pH of an electrolytic solution comprising an electrolyte, wherein the electrolyte is a compound having a quaternary ammonium cation unit, the method comprising:
   adding or mixing a compound having a cation unit represented by the following Formula (1) to the electrolytic solution:

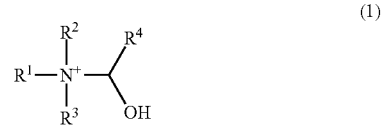
(1)

wherein $R^1$ and $R^2$ are independently a $C_{1-6}$ alkyl group or a $C_{1-4}$ alkoxy $C_{1-6}$ alkyl group, and $R^3$ and $R^4$ together form a ring.

* * * * *